(12) United States Patent
Takase

(10) Patent No.: US 10,330,855 B2
(45) Date of Patent: Jun. 25, 2019

(54) LIGHTING DEVICE AND DISPLAY DEVICE

(71) Applicant: Sharp Kabushiki Kaisha, Sakai, Osaka (JP)

(72) Inventor: Kenji Takase, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 9 days.

(21) Appl. No.: 15/546,129

(22) PCT Filed: Jan. 15, 2016

(86) PCT No.: PCT/JP2016/051126
§ 371 (c)(1),
(2) Date: Jul. 25, 2017

(87) PCT Pub. No.: WO2016/121530
PCT Pub. Date: Aug. 4, 2016

(65) Prior Publication Data
US 2018/0335561 A1 Nov. 22, 2018

(30) Foreign Application Priority Data

Jan. 27, 2015 (JP) .................................. 2015-013096

(51) Int. Cl.
*F21V 8/00* (2006.01)
*F21V 29/503* (2015.01)
(Continued)

(52) U.S. Cl.
CPC .......... *G02B 6/0068* (2013.01); *F21V 29/503* (2015.01); *G02B 6/009* (2013.01);
(Continued)

(58) Field of Classification Search
CPC .................................................... G02B 6/0068
(Continued)

(56) References Cited

U.S. PATENT DOCUMENTS

| 8,947,617 B2* | 2/2015 | Jung ................. G02F 1/133608 257/88 |
| 2004/0080924 A1 | 4/2004 | Chuang |
| 2009/0251634 A1* | 10/2009 | Lu ........................... H05K 1/189 349/58 |
| 2011/0199558 A1* | 8/2011 | Hamada ................. G02B 6/002 349/62 |
| 2011/0273905 A1* | 11/2011 | Lin ...................... G02B 6/0021 362/607 |

(Continued)

FOREIGN PATENT DOCUMENTS

| JP | 2004-146360 A | 5/2004 |
| JP | 2008-058860 A | 3/2008 |

(Continued)

OTHER PUBLICATIONS

Machine translation of JP 2004-146360,A; J-Plat Pat; Sep. 30, 2018, 21 pages.*

*Primary Examiner* — Laura K Tso
(74) *Attorney, Agent, or Firm* — ScienBiziP, P.C.

(57) ABSTRACT

A lighting device (100A) includes: at least one light-emitting device (10) that emits light; and a light guide plate (20) having a light-receiving end face (20a) that receives light which is emitted from the at least one light-emitting device (10) and an outgoing face (20b) that crosses the light-receiving end face (20a). The lighting device (100A) further includes a substrate (30) of a rectangular ring shape, the substrate having four side portions (30a, 30b, 30c, 30d). The at least one light-emitting device (10) is provided on the substrate (30).

6 Claims, 12 Drawing Sheets

(51) Int. Cl.
   *G02F 1/13357* (2006.01)
   *F21V 7/05* (2006.01)
   *F21Y 105/00* (2016.01)
   *F21V 29/70* (2015.01)
   *F21Y 103/10* (2016.01)
   *F21Y 115/10* (2016.01)
   *F21Y 103/20* (2016.01)

(52) U.S. Cl.
   CPC ......... *G02B 6/0085* (2013.01); *G02F 1/1336* (2013.01); *F21V 7/05* (2013.01); *F21V 29/70* (2015.01); *F21Y 2103/10* (2016.08); *F21Y 2103/20* (2016.08); *F21Y 2105/00* (2013.01); *F21Y 2115/10* (2016.08)

(58) Field of Classification Search
   USPC .......................................... 362/611, 612, 613
   See application file for complete search history.

(56) References Cited

U.S. PATENT DOCUMENTS

| | | | |
|---|---|---|---|
| 2012/0188465 A1* | 7/2012 | Ohyama | G02B 6/0036 348/739 |
| 2014/0098323 A1 | 4/2014 | Hashimoto | |
| 2014/0254198 A1* | 9/2014 | Jung | G02F 1/133608 362/612 |
| 2017/0146721 A1* | 5/2017 | Fukui | G09F 13/18 |

FOREIGN PATENT DOCUMENTS

| | | |
|---|---|---|
| JP | 2010-165581 A | 7/2010 |
| JP | 2010-238540 A | 10/2010 |
| JP | 2014-078369 A | 5/2014 |

* cited by examiner

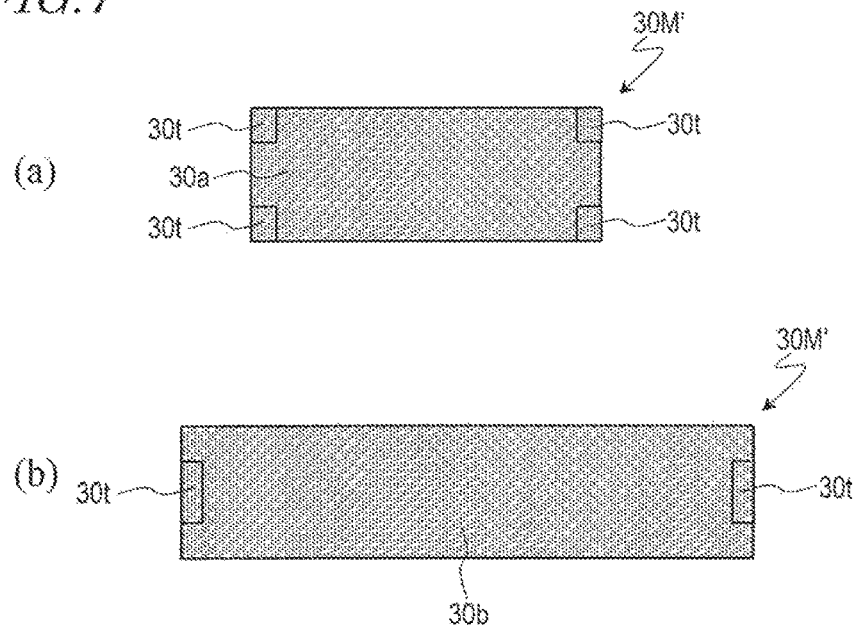
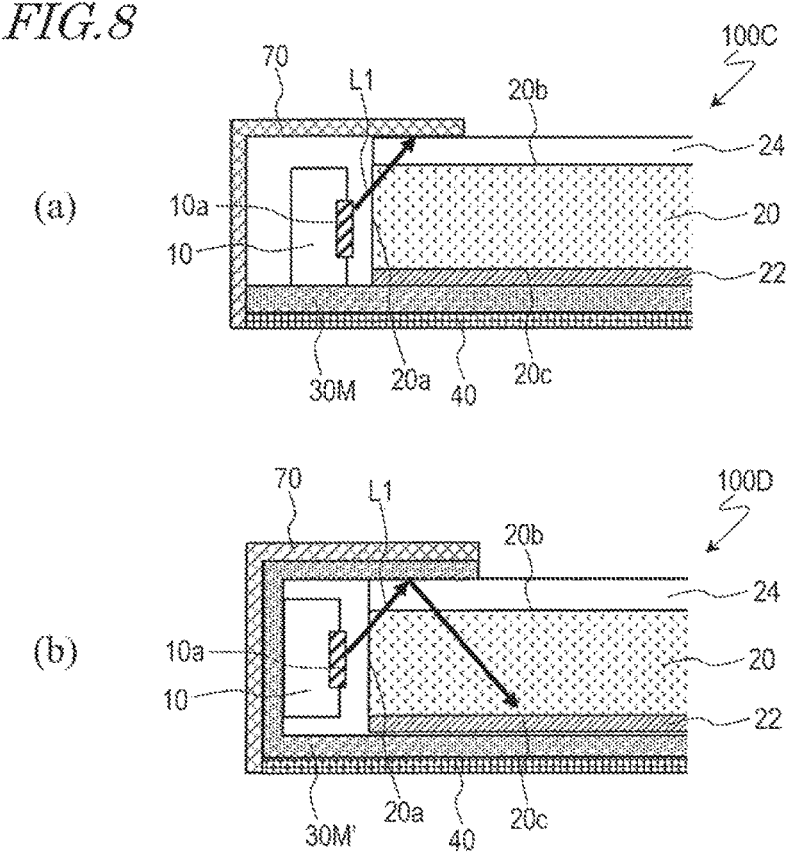

FIG.12
(a) 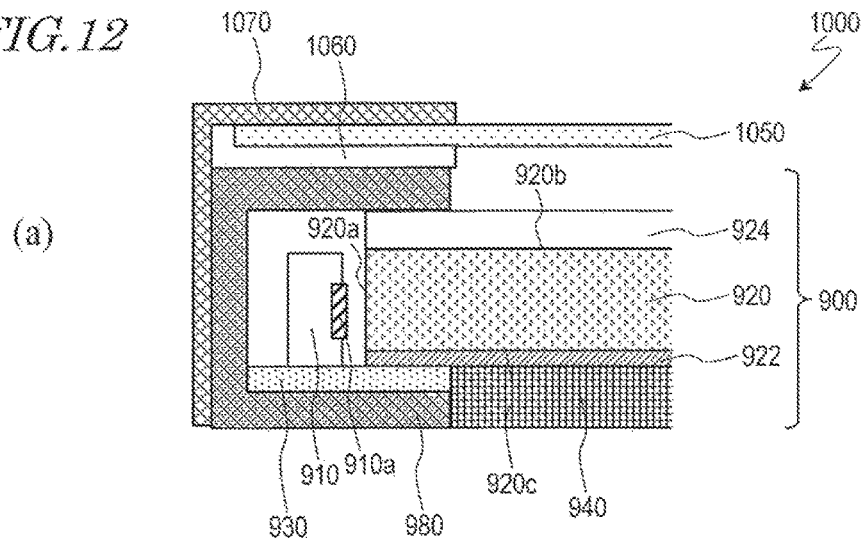
(b) 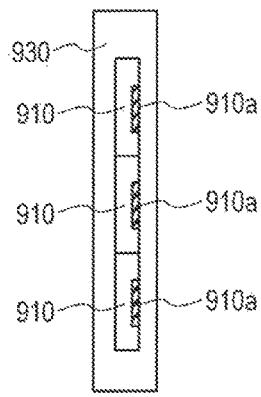

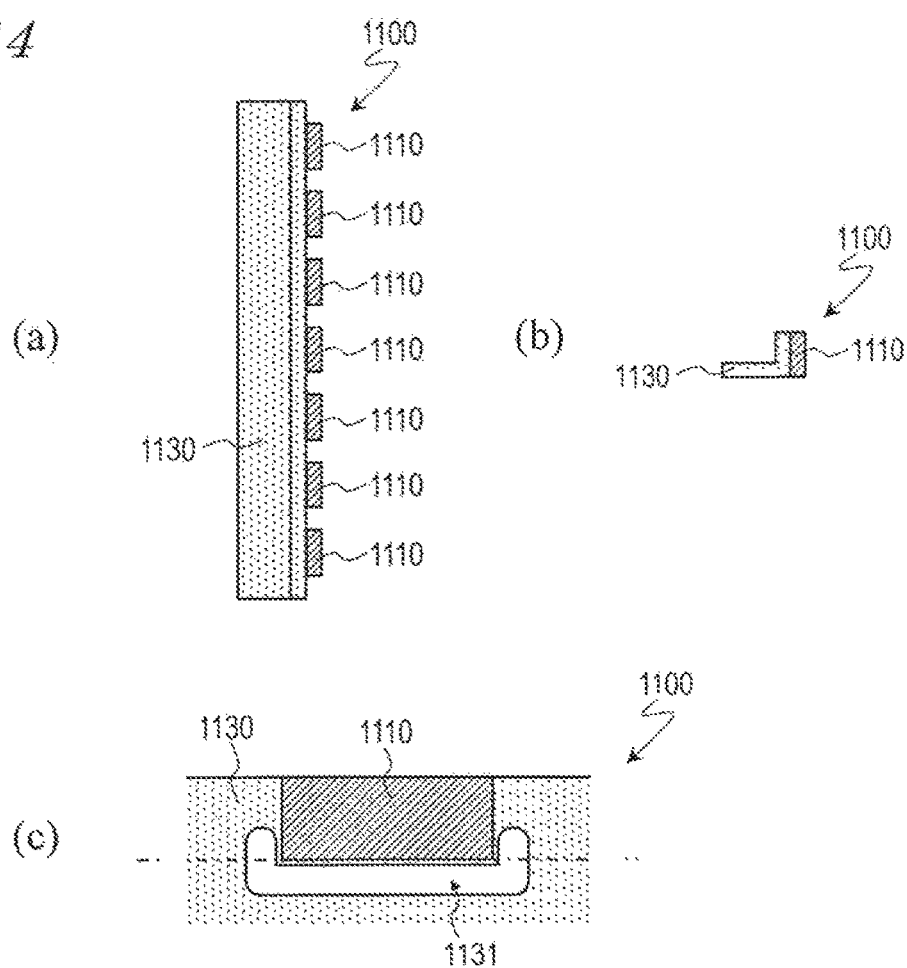

LIGHTING DEVICE AND DISPLAY DEVICE

TECHNICAL FIELD

The present invention relates to a lighting device, and more particularly to a lighting device for a display apparatus. The present invention also relates to a display apparatus which includes such a lighting device.

BACKGROUND ART

Display apparatuses of non-self-light-emitting type, e.g., liquid crystal display apparatuses, perform displaying by utilizing light which is emitted from a lighting device that is called, a backlight. Although cold cathode fluorescent lamps (CCFL) have mostly been used as the light sources in lighting devices, use of light-emitting diodes (LED) has recently been gaining prevalence.

A lighting device of a display apparatus that performs color displaying typically emits white light. Generally speaking, white light contains light of a plurality of colors within the wavelength region (380 nm to 780 nm) of visible light. For example, white LEDs combining a blue LED chip that emits blue light and a fluorescent material that emits yellow fluorescent light upon receiving blue light are widely in use. Moreover, white LEDs combining a blue LED chip and a fluorescent material that emits fluorescent light of red and green are also in use. Furthermore, white LEDs combining three LED chips respectively emitting red light, green light, and blue light are also in use. A white LED (also called a "pseudo white LED") in which one LED chip and a fluorescent material are combined is referred to as a single-chip type, whereas a white LED in which two or more LED chips are combined may be referred to as a multi-chip type. In the present specification, an LED chip is meant to be a light-emitting element (light-emitting portion), whereas an LED is meant to be a light-emitting device having an LED chip(s) mounted thereon.

Lighting devices of display apparatuses can be generally classified into direct types and edge light types. With reference to FIGS. 12(a) and (b), an example of a conventional construction of an edge light type lighting device will be described. FIG. 12(a) is a cross-sectional view schematically showing a liquid crystal display apparatus 1000 including an edge light type lighting device 900, and FIG. 12(b) is an upper plan view schematically showing a substrate 930 included in the lighting device 900.

As shown in FIG. 12(a), the liquid crystal display apparatus 1000 includes the lighting device 900 and a liquid crystal display panel 1050. The liquid crystal display panel 1050 is at the front face side of the lighting device 900 (i.e., the viewer's side).

The lighting device 900 includes a plurality of white LEDs 910 and a light guide plate 920.

Each of the plurality of white LEDs 910 has a light-emitting portion 910a. The plurality of white LEDs 910 are mounted on the substrate 930. As shown in FIG. 12(b), the substrate 930 is rectangular-shaped (strip-shaped). A heat sink 980 is provided in contact with the substrate 930. The heat sink 980 allows heat generated from the white LEDs 910 to be dissipated.

The light guide plate 920 has a light-receiving end face 920a that receives light which is emitted from the plurality of white LEDs 910 and an outgoing face (upper principal face) 920b that crosses the light-receiving end face 920a. A reflection sheet 922 is provided on the opposite side of the light guide plate 920 from the outgoing face 920b (i.e., on a lower principal face 920c). An optical film 924 is provided on the outgoing face 920b side. The lighting device 900 is supported on a backlight chassis 940.

The liquid crystal display panel 1050 is held by a panel chassis 1060. The panel chassis 1060 is held by a bezel 1070.

CITATION LIST

Patent Literature

[Patent Document 1] Japanese Laid-Open Patent Publication No. 2010-238540

SUMMARY OF INVENTION

Technical Problem

The liquid crystal display apparatus 1000 including the conventional edge light type lighting device 900 as shown in FIGS. 12(a) and (b) results in a large thickness of the entire apparatus. Moreover, since the mechanical rigidity of the entire apparatus is low, warpage and deformation due to external stress may occur, as illustrated in FIG. 13.

Patent Document 1 discloses a light-emitting module for use in a backlight that allows the mounting height of a liquid crystal display panel along the thickness direction (cell thickness direction) to be reduced. FIGS. 14(a) and (b) show a light-emitting module 1100 which is disclosed in Patent Document 1. FIGS. 14(a) and (b) are, respectively, an upper plan view and a cross-sectional view showing the light-emitting module 1100.

As shown in FIGS. 14(a) and (b), the light-emitting module 1100 includes a plurality of LED packages 1110 of top view type and a wiring board 1130. The wiring board 1130 has an L-shaped cross section, and the plurality of LED packages 1110 are mounted on a face of the wiring board 1130 that opposes the light-receiving end face of the light guide plate. As shown in FIG. 14(c), the wiring board 1130 with an L-shaped cross section is formed by, after creating recesses 1131 in the neighborhood of the regions of the plate-like wiring board 1130 where the LED packages 1110 are mounted, bending the wiring board 1130. Creating the recesses 1131 allows the mounting height of the wiring board 1130 along the cell thickness direction to be substantially equal to the length of the LED packages 1110 along the cell thickness direction.

However, in the light-emitting module 1100 of Patent Document 1, a part of the light which has gone out of the LED packages 1110 would leak through the recesses 1131, thus lowering the efficiency of light utilization and luminance.

The present invention has been made in view of the above problems, and an objective thereof is to provide a lighting device which can easily be made thin and yet excels in mechanical rigidity.

Solution to Problem

A lighting device according to an embodiment of the present invention is a lighting device comprising: at least one light-emitting device that emits light; and a light guide plate having a light-receiving end face that receives light which is emitted from the at least one light-emitting device and an outgoing face that crosses the light-receiving end face, wherein, the lighting device further comprises a substrate of a rectangular ring shape, the substrate having four side portions; and the at least one light-emitting device is provided on the substrate.

In one embodiment, the at least one light-emitting device is disposed on one side portion among the four side portions of the substrate.

In one embodiment, the at least one light-emitting device comprises a plurality of light-emitting devices; and the plurality of light-emitting devices are disposed on two or more side portions among the four side portions of the substrate.

In one embodiment, the substrate is made of a metal material.

In one embodiment, each of the four side portions of the substrate has an angular C-shaped cross section.

A display apparatus according to an embodiment of the present invention comprises a lighting device of the above construction; and a display panel provided on the outgoing face side of the light guide plate.

In one embodiment, the substrate includes a guide portion which causes the display panel to be positioned Advantageous Effects of Invention According to an embodiment of the present invention, a lighting device which can easily be made thin and yet excels in mechanical rigidity is provided.

BRIEF DESCRIPTION OF DRAWINGS

FIG. 7 (a) and (b) are side views showing the substrate 30M' as viewed in directions A and B, respectively, in FIG. 6(c).

FIG. 8 (a) is a diagram schematically showing how, in the lighting device 100C according to Embodiment 3, light L1 which has obliquely exited from a light-emitting device 10 may be absorbed by a bezel 70; (b) is a diagram schemati-cally showing how, in the lighting device 100D according to Embodiment 4, light L1 which has obliquely exited from a light-emitting device 10 may be reflected off the surface of the substrate 30M'.

FIG. 12 (a) is a cross-sectional view schematically showing a liquid crystal display apparatus 1000 including a conventional edge light type lighting device 900; and (b) is an upper plan view schematically showing a substrate 930 which is included in the lighting device 900.

FIG. 14 (a) and (b) are, respectively, an upper plan view and a cross-sectional view showing a light-emitting module 1100 which is disclosed in Patent Document 1; and (c) is a plan view schematically showing a recess 1131 for allowing a wiring board 1130 of a light-emitting module 1100 to be bent.

DESCRIPTION Of EMBODIMENTS

Hereinafter, with reference to the drawings, embodiments of the present invention will be described. Note following embodiments.

(Embodiment 1)

Figure 1:
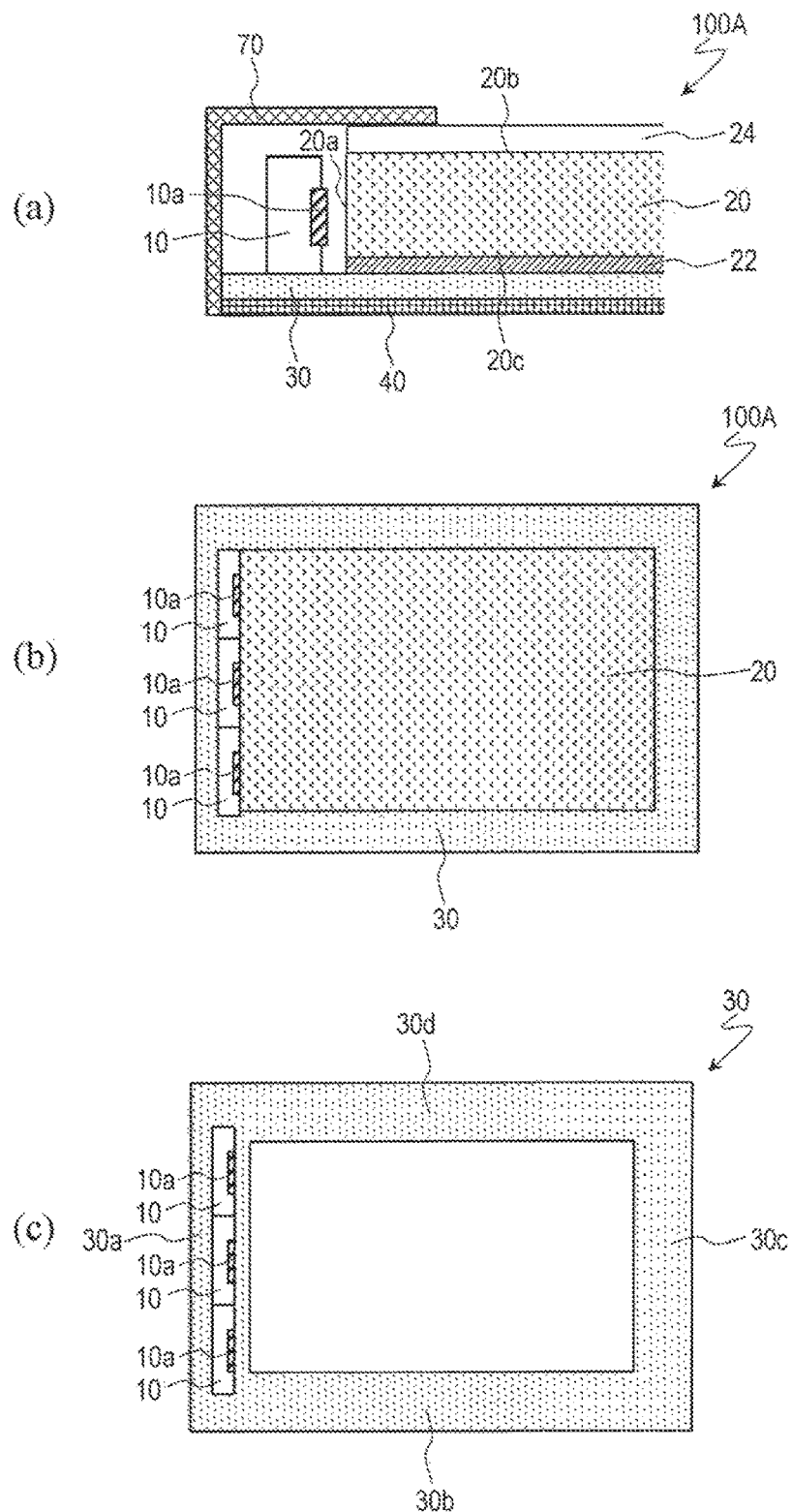
FIG. 1(a) is a cross-sectional view schematically showing a lighting device 100A according to Embodiment 1; (b) is an upper plan view schematically showing the lighting device 100A; and (c) is an upper plan view schematically showing light-emitting devices 10 and a substrate 30 included in the lighting device 100A.

With reference to FIGS. 1(a), (b) and (c), a lighting device 100A according to the present embodiment will be described. The lighting device 100A is a backlight for a liquid, crystal display apparatus. FIG. 1 (a) is a cross-sectional view schematically showing the lighting device 100A; and FIG. 1(b) is an upper plan view schematically showing the lighting device 100A. FIG. 1(c) is an upper plan view schematically showing light-emitting devices 10 and a substrate 30 included in the lighting device 100A.

As shown in FIGS. 1(a) and (b), the lighting device 100A includes a plurality of light-emitting devices 10, a light guide plate 20, and a substrate 30.

The plurality of light-emitting devices 10 emit light. In the present embodiment, each of the plurality of light-emitting devices 10, which is a single-chip type white LED having one light-emitting portion (chip) 10a, emits white light. Although an example is illustrated herein where the lighting device 100A includes a plurality of light-emitting devices 10, there may alternatively be one light-emitting device 10. Although single-chip type white LEDs are exemplified herein, multi-chip type white LEDs may also be used. Furthermore, LEDs other than white LEDs (e.g., a set of red LEDs, green LEDs, and blue LEDs) may also be used.

The light guide plate 20 has a light-receiving end face 20a that receives light which is emitted from the plurality of light-emitting devices 10, and an outgoing face (upper principal face) 20b that crosses the light-receiving end face 20a. Light which has entered into the light guide plate 20 from the light-receiving end face 20a, in the course of propagating in the light guide plate 20, exits from the outgoing face 20b. On at least one of the outgoing face 20b and a principal face (lower principal face) 20c that is opposite from the outgoing face 20b, a structure (e.g., prisms or grain) is formed for causing the light propagating inside the light guide plate 20 to exit through the outgoing face 20b.

A reflection sheet 22 is at the lower principal face 20c side of the light guide plate 20. The reflection sheet 22 is provided in order to reuse the light which has exited from the lower principal face 20c.

An optical film 24 is at the outgoing face 20b side of the light guide plate 20. The optical film 24 is provided in order to control the directivity and the like of the light which has exited from the light guide plate 20. As the optical film 24, various optical films for edge light type backlights may be used. The optical film 24 may include, for example, a diffusion-based sheet (e.g., a diffusion sheet or a microlens sheet) in its lower layer (i.e., immediately above the light guide plate 20), a prism sheet in its intermediate layer, and a reflective polarizing sheet or a prism sheet in its upper layer.

As shown in FIG. 1(c), the substrate (wiring board) 30 has a rectangular ring shape, and includes four side portions 30a, 30b, 30c and 30d. In the present embodiment, the substrate 30 is made of a glass epoxy material, a CEM (composite epoxy) material, a BT resin material, or the like, and the four side portions 30a, 30b, 30c and 30d are formed into an integral piece. The substrate 30 has a size corresponding to the frame region of a liquid crystal display apparatus, such that the four side portions 30a, 30b, 30c and 30d of the substrate 30 surround the outer periphery of the light guide plate 20 as viewed from the normal direction of the display surface.

The plurality of light-emitting devices 10 are provided (i.e., mounted) on the substrate 30. In the present embodiment, the plurality of light-emitting devices 10 are disposed on one side portion 30a, which is among the four side portions 30a, 30b, 30c and 30d, of the substrate 30.

The substrate 30 having the light-emitting devices 10 mounted thereon and the light guide plate 20 are supported on a backlight chassis 40. The backlight chassis 40 is held by a bezel 70 (which is omitted in FIG. 1(b)).

As has already been described, in the conventional lighting device 900, the substrate 930 having the light-emitting devices 910 mounted thereon is strip-shaped (see FIG. 12(b)).

Figure 2:
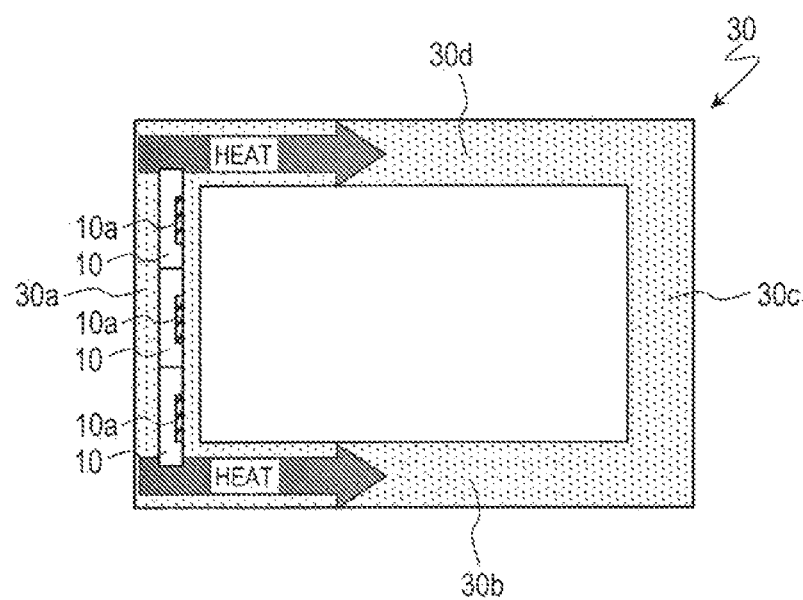
FIG. 2 A diagram schematically showing how heat which is generated from the light-emitting devices 10 may be dissipated through the substrate 30.

On the other hand, in the lighting device 100A according to the present embodiment, the substrate 30 having the light-emitting devices 10 mounted thereon has a rectangular ring shape (see FIG. 1(c)), thus possessing a larger area than does the substrate 930 of the conventional lighting device 900. Therefore, as shown in FIG. 2, heat which is generated from the light-emitting devices 10 can be dissipated, efficiently (i.e., not only from, the side portion 30a on which the light-emitting devices 10 are mounted but also from the other side portions 30b, 30c and 30d), whereby sufficient temperature lowering effects can be obtained with the substrate 30 alone. Therefore, in the lighting device 100A according to the present embodiment, no heat sink (e.g., the heat sink 980 which would be provided in the conventional-lighting device 900) needs to be provided in addition to the substrate 30, whereby the number of parts can be reduced and a thin profile can be attained. Moreover, in order to attain a thin profile, there is no need to form recesses 1131 in the wiring board 1130 as would be required for the light-emitting module 1100 of Patent Document 1; therefore, any lowering in the efficiency of light utilization and luminance associated with such recesses 1131 will not occur.

Furthermore, in the lighting device 100A according to the present embodiment, the substrate 30 has a rectangular ring shape as described above, whereby the mechanical rigidity of the entire apparatus can be increased over that of the conventional lighting device 900. Therefore, wax-page and deformation due to external stress can be suppressed.

Thus, the lighting device 100A according to the present embodiment easily attains a thin profile, and excels in mechanical rigidity.

(Embodiment 2)

Figure 3:
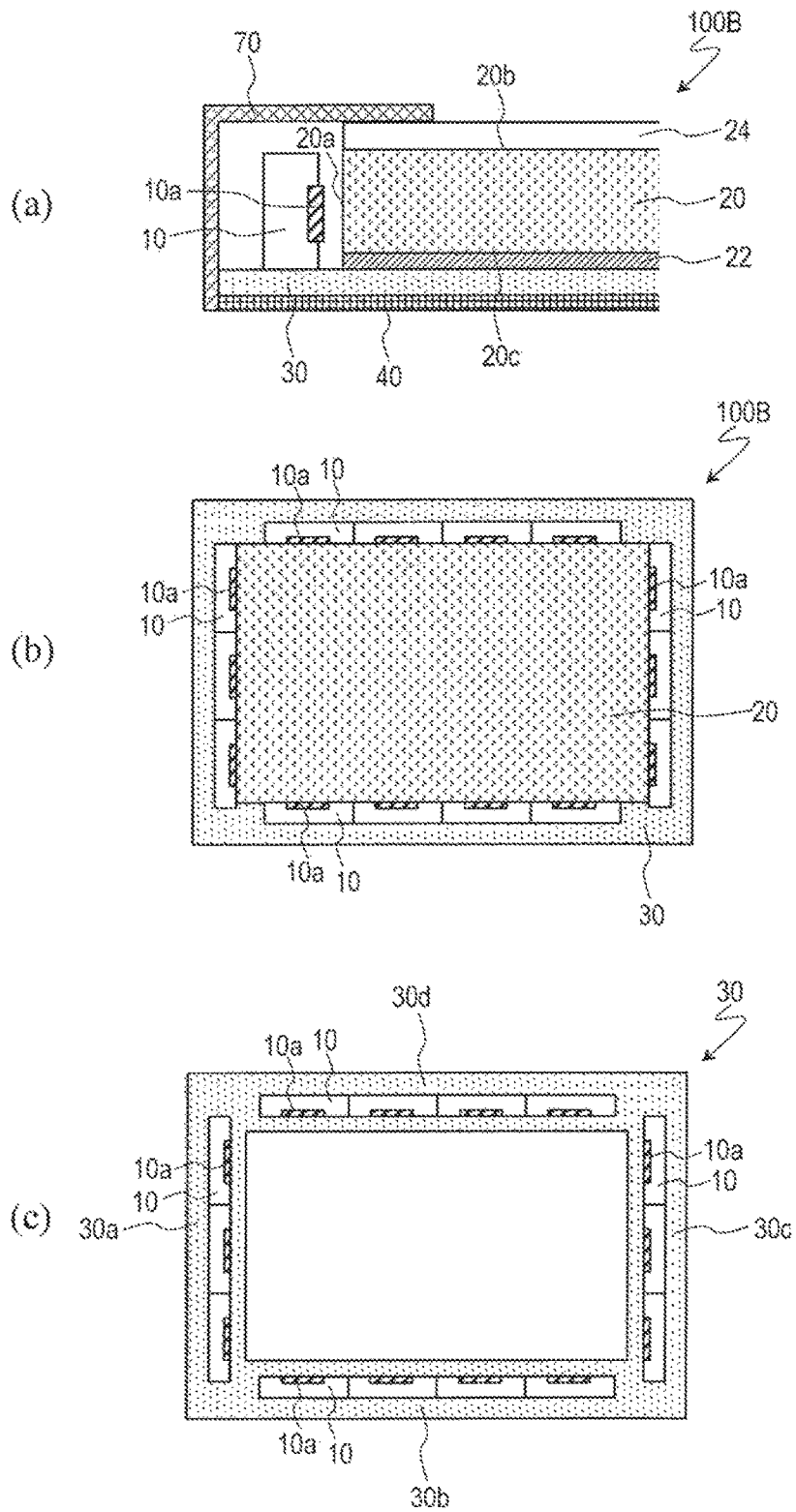
FIG. 3 (a) is a cross-sectional view schematically showing a lighting device 100B according to Embodiment 2; (b) is an upper plan view schematically showing the lighting device 100B; and (c) is an upper plan view schematically showing light-emitting devices 10 and a substrate 30 included in the lighting device 100B.

With reference to FIGS. 3 (a), (b) and (c), a lighting device 100B according to the present embodiment will be described. FIG. 3(a) is a cross-sectional view schematically showing the lighting device 100B; and FIG. 3 (b) is an upper plan view schematically showing the lighting device 100B. FIG. 3(c) is an upper plan view schematically showing light-emitting devices 10 and a substrate 30 included in the lighting device 100B. Hereinafter, differences of the lighting device 100B from the lighting device 100A of Embodiment 1 will be mainly described.

As shown in FIGS. 3(a), (b) and (c), the lighting device 100B of the present embodiment includes a plurality of light-emitting devices 10, a light guide plate 20, and a substrate 30, where the substrate 30 has a rectangular ring shape. In this aspect, it is similar to the lighting device 100A according to Embodiment 1.

In the lighting device 100A according to Embodiment 1, the plurality of light-emitting devices 10 are disposed on one side portion 30a among the four side portions 30a, 30b, 30c and 30d of the substrate 30. On the other hand, in the lighting device 100B of the present embodiment, as shown in FIGS. 3 (b) and (c), the plurality of light-emitting devices 10 are disposed on two or more side portions among the four side portions 30a, 30b, 30c and 30d of the substrate 30. More specifically, the plurality of light-emitting devices 10 are disposed on all of the four side portions 30a, 30b, 30c and 30d of the substrate 30.

Thus, by disposing the plurality of light-emitting devices 10 on more than one side portions of the substrate 30, it is possible to increase the number of light-emitting devices 10 to foe mounted on the substrate 30, whereby a high luminance can be achieved.

Although FIGS. 3(b) and (c) illustrate an example where the plurality of light-emitting devices 10 are disposed on ail of the side portions 30a, 30b, 30c and 30d of the substrate 30, it is not required that the light-emitting devices 10 be disposed on all of the side portions 30a, 30b, 30c and 30d.

Figure 4:
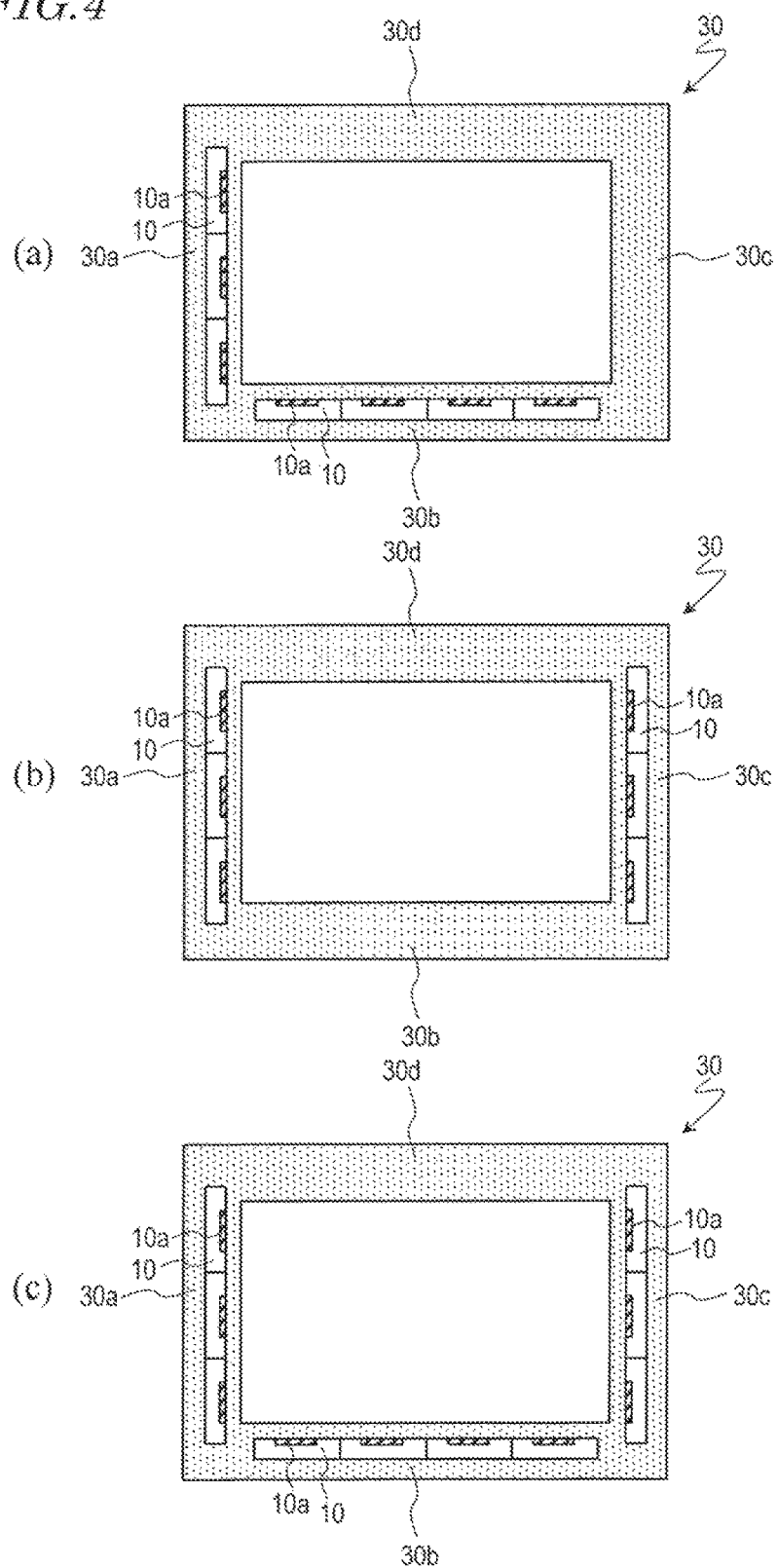
FIG. 4 (a), (b) and (c) are upper plan views showing other exemplary arrangements of light-emitting devices 10 on the substrate 30.

For example, as shown in FIGS. 4 (a) and (b), the plurality of light-emitting devices 10 may be disposed on two of the four side portions 30a, 30b, 30c and 30d of the substrate 30, or, as shown in FIG. 4 (c), the plurality of light-emitting devices 10 may be disposed on three of the four side portions 30a, 30b, 30c and 30d of the substrate 30.

(Embodiment 3)

Figure 5:
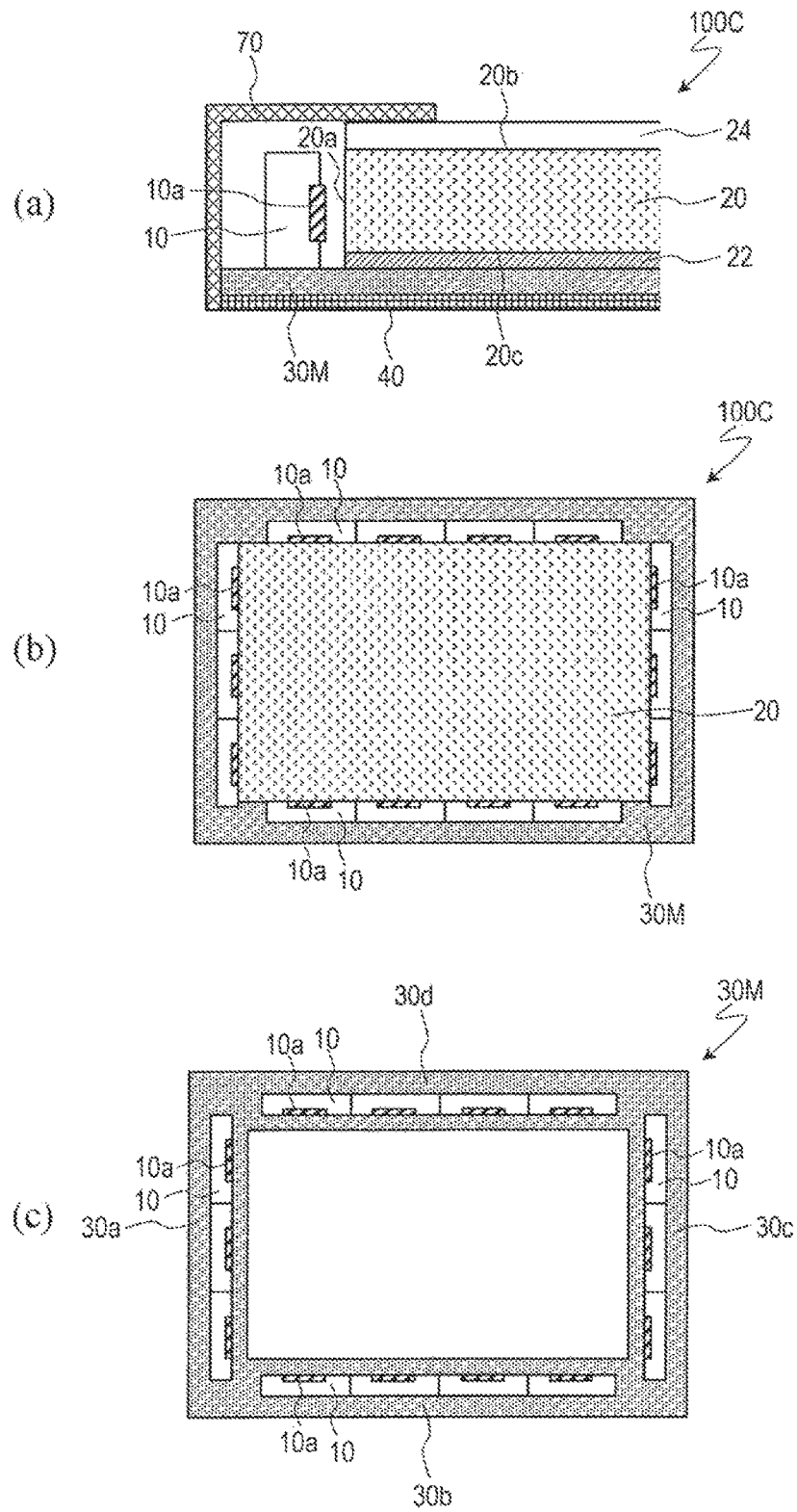
FIG. 5 (a) is a cross-sectional view schematically showing a lighting device 100C according to Embodiment 3; (b) is an upper plan view schematically showing the lighting device 100C; and (c) is an upper plan view schematically showing light-emitting devices 10 and a substrate 30M included in the lighting device 100C.

With reference to FIGS. 5(a), (b) and (c), a lighting device 100C according to the present embodiment will be described. FIG. 5(a) is a cross-sectional view schematically showing the lighting device 100C; and FIG. 5(*b*) is an upper plan view schematically showing the lighting device 100C. FIG. 5(*c*) is an upper plan view schematically showing light-emitting devices 10 and a substrate 30M included in the lighting device 100C. Hereinafter, differences of the lighting device 100C from the lighting device 100B of Embodiment 2 will be mainly described.

As shown in FIGS. 5 (*a*), (*b*) and (*c*), the lighting device 100C of the present embodiment includes a plurality of light-emitting devices 10, a light guide plate 20, and a substrate 30M, where the substrate 30M has a rectangular ring shape. In this aspect, it is similar to the lighting device 100B according to Embodiment 2.

However, in the lighting device 100C of the present embodiment, the substrate 30M is made of a metal material (e.g., copper or aluminum).

Thus, the substrate 30M being made of a metal material allows the thermal conductivity of the substrate 30M to be increased, whereby the heat which is generated from the light-emitting devices 10 can be dissipated even more efficiently. Therefore, increase in the temperature of the light-emitting devices 10 can be further suppressed, and deteriorations in the emission efficiency of the light-emitting devices 10 can be further suppressed. Moreover, the substrate 30M being made of a metal material also provides an effect of further enhancing the mechanical rigidity of the entire apparatus.

Although there is no particular limitation as to the metal material composing the substrate 30M, it is preferably a metal material of high thermal conductivity, such as copper or aluminum as mentioned above.

(Embodiment 4)

Figure 6:
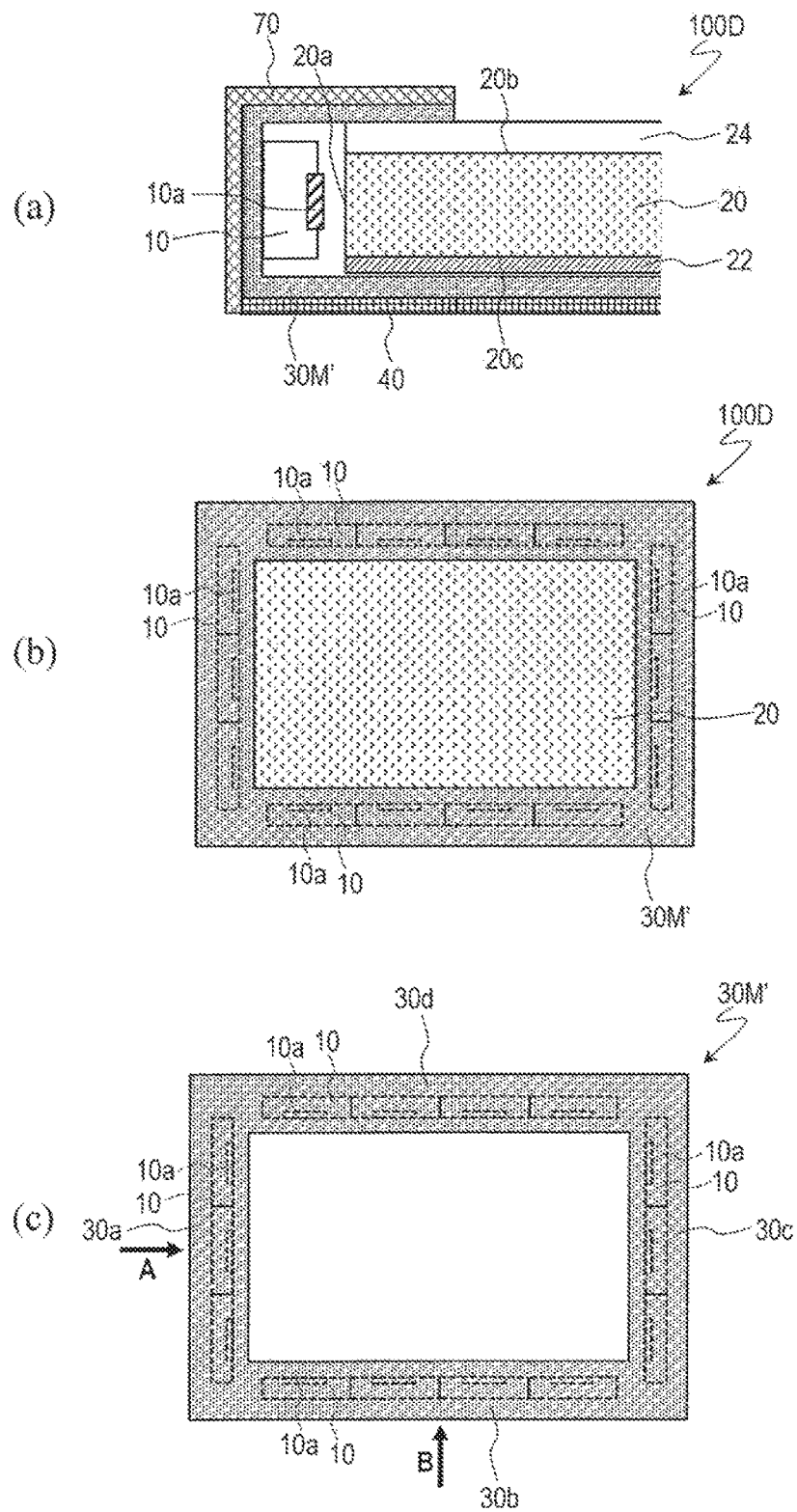
FIG. 6 (a) is a cross-sectional view schematically showing a lighting device 100D according to Embodiment 4; (b) is an upper plan view schematically showing the lighting device 100D; and (c) is an upper plan view schematically showing light-emitting devices 10 and a substrate 30M' included in the lighting device 100D.

With reference to FIGS. 6(*a*), (*b*) and (*c*) and FIGS. 7(*a*) and (*b*), a lighting device 100D according to the present embodiment will be described. FIG. 6(*a*) is a cross-sectional view schematically showing the lighting device 100D; and FIG. 6(*b*) is an upper plan view schematically showing the lighting device 100D. FIG. 6(*c*) is an upper plan view schematically showing light-emitting devices 10 and a substrate 30M' included in the lighting device 100D, FIGS. 7(*a*) and (*b*) are side views showing the substrate 30M' as viewed in directions A and B, respectively, in FIG. 6(*c*). Hereinafter, differences of the lighting device 100D from the lighting device 100C of Embodiment 3 will be mainly described.

As shown in FIGS. 6 (*a*), (*b*) and (*c*), the lighting device 100D of the present embodiment includes a plurality of light-emitting devices 10, a light guide plate 20, and a substrate 30M', where the substrate 30M' has a rectangular ring shape and is made of a metal material. In this aspect, it is similar to the lighting device 100C according to Embodiment 3.

However, in the lighting device 100D of the present embodiment, each of the four side portions 30*a*, 30*b*, 30*c* and 30*d* of the substrate 30M' has an angular C-shaped cross section, as is illustrated in FIGS. 6(*a*), (*b*) and (*c*) and FIGS. 7(*a*) and (*b*) (see, in particular, FIG. 6(*a*)). The edge (outer peripheral portion) of the light guide plate 20 is inserted in the vacant spaces within the four side portions 30*a*, 30*b*, 30*c* and 30*d*. Insertion of the edge of the light guide plate 20 is achieved by flexing the light guide plate 20. Moreover, the surface of the substrate 30M' is coated with a white resist having high reflectance.

In the lighting device 100C according to Embodiment 3, as shown in FIG. 8(*a*), light L1 which has obliquely exited from the light-emitting devices 10 may be absorbed by the bezel 70 and lower the efficiency of light utilization. On the other hand, in the lighting device 100D of the present embodiment, each of the four side portions 30*a*, 30*b*, 30*c* and 30*d* of the substrate 30M' has an angular C-shaped cross section; therefore, as shown in FIG. 8(*b*), light L1 which has obliquely exited from the light-emitting devices 10 is reflected off the surface of the substrate 30M' so as to become available for lighting. Thus, light L1 which has obliquely exited undergoes less absorption, whereby the efficiency of light utilization is improved.

It is not necessary for the surface of the substrate 30M' to be coated with a white resist; however, from the standpoint of improving the efficiency of light utilization, it is preferable that the surface of the substrate 30M' be covered with a material of high reflectance.

Figure 9:
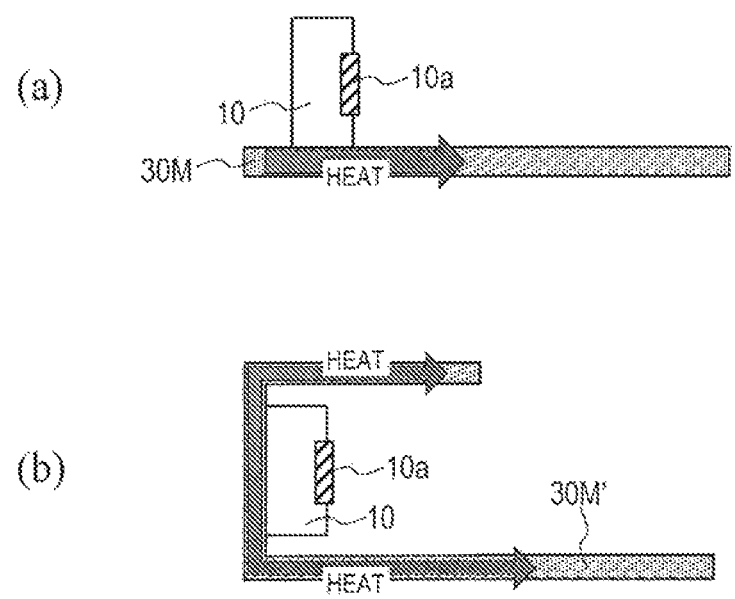
FIG. 9 (a) is a diagram schematically showing how, in the lighting device 100C according to Embodiment 3, heat which is generated from the light-emitting devices 10 may be dissipated through the substrate 30M; and (b) is a diagram schematically showing how, in the lighting device 100D according to Embodiment 4, heat which is generated from the light-emitting devices 10 may be dissipated through the substrate 30M'.

As will be seen from a comparison between FIG. 9(*a*) and FIG. 9(*b*), the substrate 30M' of the lighting device 100D of the present embodiment has a broader substrate area than that of substrate 30M of the lighting device 100C according to Embodiment 3, thus enabling more efficient heat dissipation. Thus, a high luminance is achieved by a further improved emission efficiency of the light-emitting devices 10.

In the construction illustrated in FIGS. 7 (*a*) and (*b*), each of the four side portions 30*a*, 30*b*, 30*c* and 30*d* of the substrate 30M' has a tongue 30*t* which is bent so as to overlap its adjacent side portion. Providing such tongues 30*t* allows the rigidity of the substrate 30M' itself to be improved. There are no particular limitations as to the shapes and number of tongues 30*t*.

(Embodiment 5)

Figure 10:
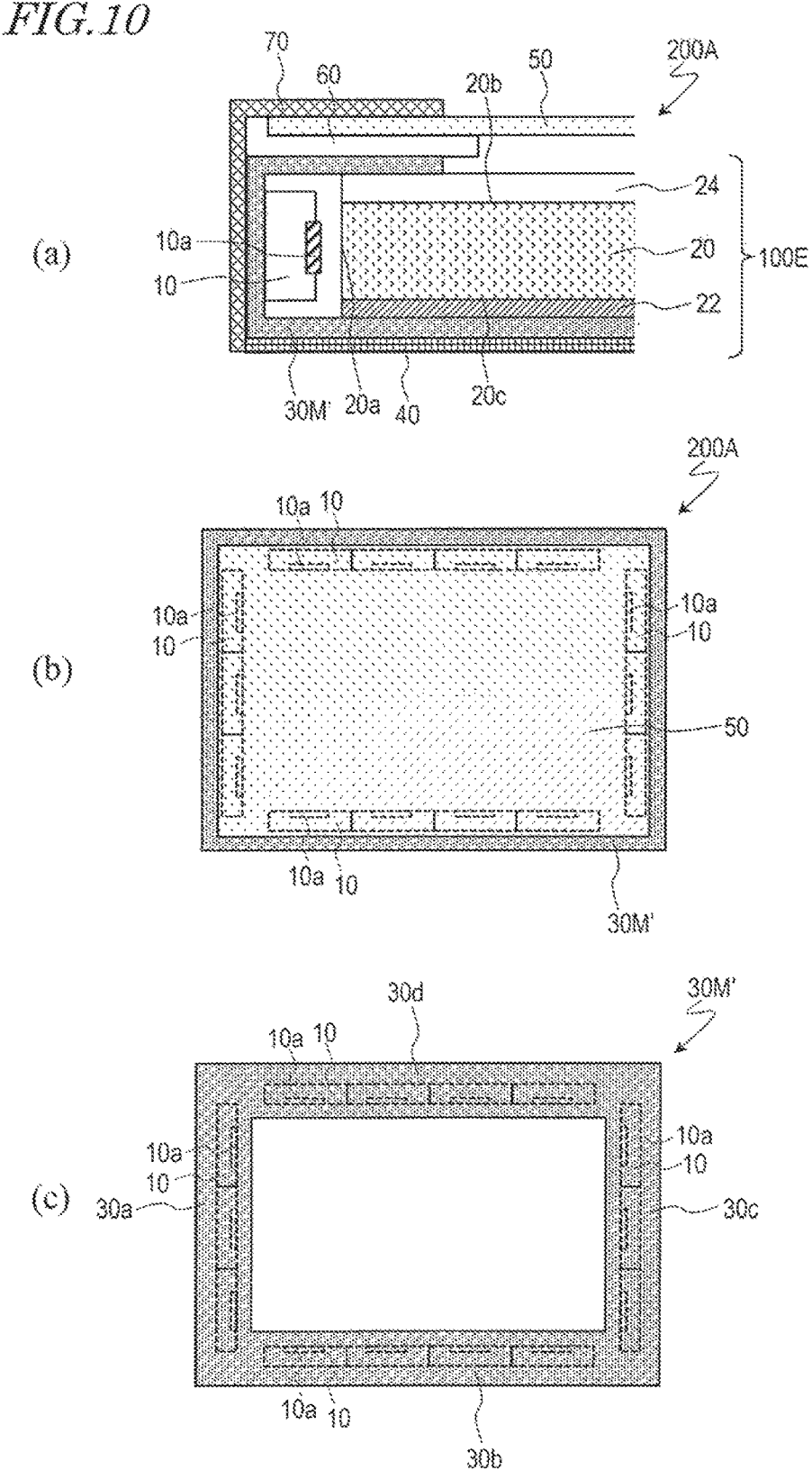
FIG. 10 (a) is a cross-sectional view schematically showing a liquid crystal display apparatus 200A according to Embodiment 5; (b) is an upper plan view schematically showing the liquid crystal display apparatus 200A; and (c) is an upper plan view schematically showing light-emitting devices 10 and a substrate 30M' included in the liquid crystal display apparatus 200A.

With reference to FIGS. 10(*a*), (*b*) and (*c*), a liquid crystal display apparatus 200A according to the present embodiment will be described. FIG. 10(*a*) is a cross-sectional view schematically showing the liquid crystal display apparatus 200A; and FIG. 10(*b*) is an upper plan view schematically showing the liquid crystal display apparatus 200A. FIG. 10(*c*) is an upper plan view schematically showing light-emitting devices 10 and a substrate 30M' included in the liquid crystal display apparatus 200A.

As shown in FIGS. 10(*a*) and (*b*), the liquid crystal display apparatus 200A includes a lighting device 100E and a display panel (liquid crystal display panel) 50 which is provided on the outgoing face 20*b* side of the light guide plate 20 of the lighting device 100E.

As shown in FIG. 10(*a*) and FIG. 10(*c*), the lighting device 100E has substantially the same construction as that of the lighting device 100D according to Embodiment 4.

The liquid crystal display panel 50 may be a liquid crystal display panel of any of various known display modes. The liquid crystal display panel 50 is held by a panel chassis 60 (which is omitted in FIG. 10(*b*)) in its frame region. The panel chassis 60 is held by a bezel 70.

Light which goes out from the lighting device 100E enters the liquid crystal display panel 50 so as to be used for displaying. Displaying is conducted by adjusting the amount of transmitted light through the liquid crystal display panel 50.

(Embodiment 6)

Figure 11:
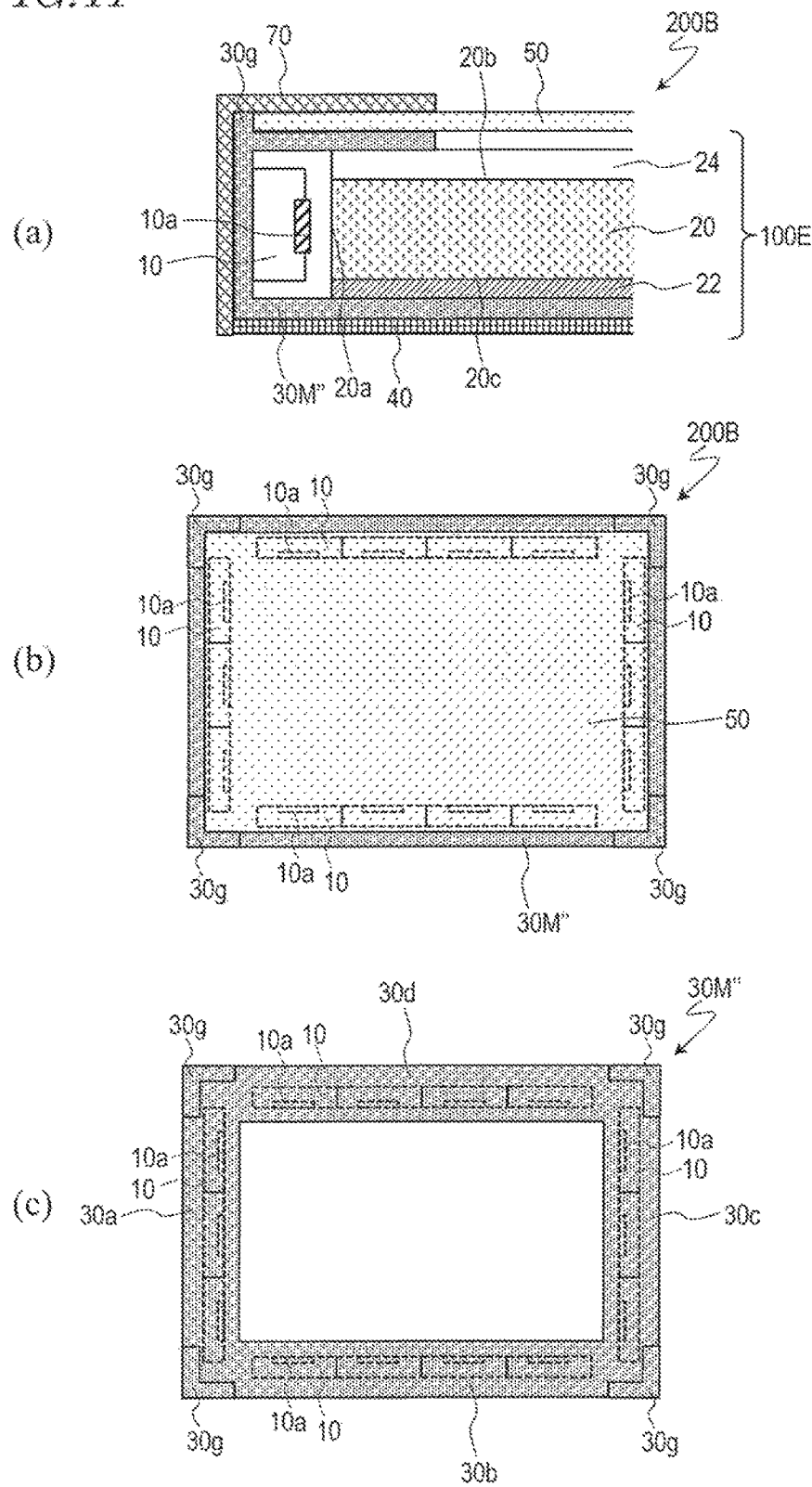
FIG. 11 (a) is a cross-sectional view schematically showing a liquid crystal display apparatus 200B according to Embodiment 6; (b) is an upper plan view schematically showing the liquid crystal display apparatus 200B; and (c) is an upper plan view schematically showing light-emitting devices 10 and a substrate 30M" included in the liquid crystal display apparatus 200B.
Figure 13:
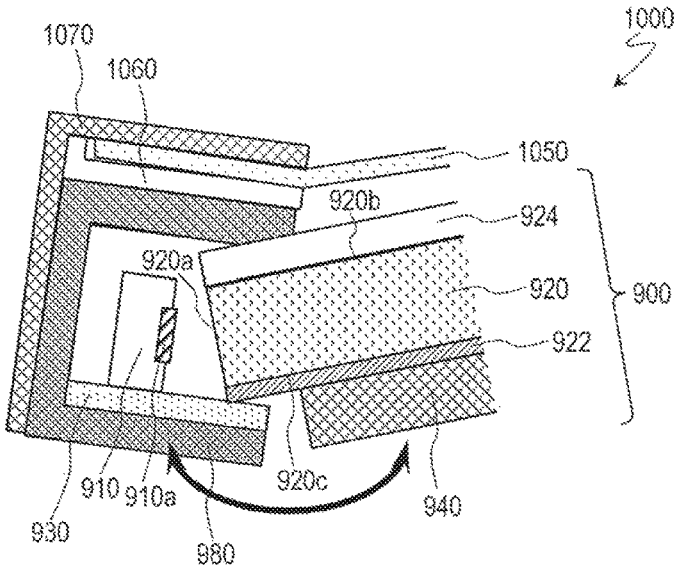
FIG. 13 A diagram schematically showing how warpage and deformation may occur in response to external stress being applied to the liquid crystal display apparatus 1000.

With reference to FIGS. 11(*a*), (*b*) and (*c*), a liquid crystal display apparatus 200B according to the present embodiment will be described. FIG. 11(*a*) is a cross-sectional view schematically showing the liquid crystal display apparatus 200B; and FIG. 11(*b*) is an upper plan view schematically showing the liquid crystal display apparatus 200B. FIG. 11(*c*) is an upper plan view schematically showing light-emitting devices 10 and a substrate 30M" included in the liquid crystal display apparatus 200B. Hereinafter, differences of the liquid crystal display apparatus 200B from the liquid crystal display apparatus 200A of Embodiment 5 will be mainly described.

As shown in FIGS. 11(a), (b) and (c), the liquid crystal display apparatus 200B according to the present embodiment differs from the liquid crystal display apparatus 200A according to Embodiment 5 in that the substrate 30M" of the lighting device 100E includes guide portions 30g for positioning the liquid crystal display panel 50 relative to the lighting device 100E.

The guide portions 30g are provided in four corner portions of the substrate 30M", each presenting a "<"-shaped (L-shape) as viewed from the normal direction of the display surface. As a corner portion of the liquid crystal display panel 50 abuts against each guide portion 30g, the liquid crystal display panel 50 is positioned relative to the lighting device 100E.

Thus, when the substrate 30M" includes guide portions 30g for positioning the liquid crystal display panel 50 relative to the lighting device 100E, the panel chassis 60 which is included in the liquid crystal display apparatus 200A according to Embodiment 5 can be omitted, thereby allowing for a thin profile. It is also possible to reduce the production cost based on a reduced number of parts.

The shape of the guide portions 30g is not limited to the example given here, but may be any shape that allows the liquid crystal display panel 50 to be positioned relative to the lighting device 100E. The number of guide portions 30g is not limited to the example given here.

Although Embodiments 1 to 6 above illustrate liquid crystal display apparatuses and lighting devices for use in liquid crystal display apparatuses, embodiments of the present invention also encompass lighting devices for display apparatuses other than liquid crystal display apparatuses, and lighting devices for use in illuminated signs (e.g., internally-lit signs).

The present specification discloses lighting devices and display apparatuses according to the following Items.

[Item 1]
A lighting device comprising:
at least one light-emitting device that emits light; and
a light guide plate having a light-receiving end face that receives light which is emitted from the at least one light-emitting device and an outgoing face that crosses the light-receiving end face, wherein,
the lighting device further comprises a substrate of a rectangular ring shape, the substrate having four side portions; and
the at least one light-emitting device is provided on the substrate.

[Item 2]
The lighting device of Item 1, wherein the at least one light-emitting device is disposed on one side portion among the four side portions of the substrate.

[Item 3]
The lighting device of Item 1, wherein,
the at least one light-emitting device comprises a plurality of light-emitting devices; and
the plurality of light-emitting devices are disposed on two or more side portions among the four side portions of the substrate.

[Item 4]
The lighting device of any of Items 1 to 3, wherein the substrate is made of a metal material.

[Item 5]
The lighting device of any of Items 1 to 4, wherein each of the four side portions of the substrate has an angular C-shaped cross section.

[Item 6]
A display apparatus comprising:
the lighting device of any of Items 1 to 5; and
a display panel provided on the outgoing face side of the light guide plate.

[Item 7]
The display apparatus of Item 6, wherein the substrate includes a guide portion which causes the display panel to be positioned relative to the lighting device.

INDUSTRIAL APPLICABILITY

According to an embodiment of the present invention, a lighting device which can easily be made thin and yet excels in mechanical rigidity is provided. A lighting device according to an embodiment of the present invention is suitably used as a backlight of a display apparatus, such as a liquid crystal display apparatus.

REFERENCE SIGNS LIST 10 light-emitting device (white LED)
10a light-emitting portion (chip)
20 light guide plate
20a light-receiving end face
20b outgoing face (upper principal face)
20c lower principal face
22 reflection sheet
24 optical film
30, 30M, 30M', 30M" substrate
30a, 30b, 30c, 30d side portion
30g guide portion
30t tongue
40 backlight chassis
50 display panel (liquid crystal display panel)
60 panel chassis
70 bezel
100A, 100B, 100C, 100D, 100E lighting device
200A, 200B liquid crystal display apparatus

The invention claimed is:
1. A display apparatus comprising:
a lighting device including:
at least one light-emitting device that emits light; and
a light guide plate having a light-receiving end face that receives light which is emitted from the at least one light-emitting device and an outgoing face that emits light which has entered into the light guide plate through the light-receiving end face, wherein,
the display apparatus further comprises a display panel provided on the outgoing face side of the light guide plate;
the lighting device further includes a substrate of a rectangular ring shape, the substrate having four side portions;
the at least one light-emitting device is provided on the substrate;
each of the four side portions of the substrate has an angular C-shaped cross section; and
the substrate includes a guide portion which causes the display panel to be positioned relative to the lighting device.

2. The display apparatus of claim 1, wherein the at least one light-emitting device is disposed on one side portion among the four side portions of the substrate.

3. The display apparatus of claim 1, wherein,
the at least one light-emitting device comprises a plurality of light-emitting devices; and
the plurality of light-emitting devices are disposed on two or more side portions among the four side portions of the substrate.

4. The display apparatus of claim 1, wherein the substrate is made of a metal material.

5. The display apparatus of claim 1, wherein,
the substrate includes a corner portion where two side portions among the four side portions intersect with each other; and
the guide portion is provided in the corner portion.

6. The display apparatus of claim 1, wherein,
as viewed from a normal direction of a display surface, the guide portion has a L-shape.

* * * * *